United States Patent [19]
Trainer

[11] Patent Number: 5,865,874
[45] Date of Patent: Feb. 2, 1999

[54] HYDROGEN STORAGE ALLOY

[75] Inventor: Philip D. Trainer, Medway, Mass.

[73] Assignee: Duracell Inc., Bethel, Conn.

[21] Appl. No.: 884,592

[22] Filed: Jun. 27, 1997

[51] Int. Cl.[6] ................................................ B22F 9/16
[52] U.S. Cl. ............................ 75/362; 75/363; 148/247; 420/900; 29/623.1
[58] Field of Search ........................... 75/362, 363, 343; 420/900; 429/101, 116, 54, 59, 206, 218; 148/247; 29/623.1

[56] References Cited

U.S. PATENT DOCUMENTS

| | | | |
|---|---|---|---|
| 4,499,160 | 2/1985 | Babai et al. | 429/101 |
| 4,837,119 | 6/1989 | Ikoma et al. | 429/206 |
| 4,977,043 | 12/1990 | Kadouchi et al. | 429/54 |
| 4,994,334 | 2/1991 | Ikoma et al. | 429/206 |
| 5,250,369 | 10/1993 | Yuasa et al. | 429/59 |
| 5,451,474 | 9/1995 | Wu et al. | 429/59 |
| 5,470,675 | 11/1995 | Einerhand et al. | 429/101 |
| 5,554,456 | 9/1996 | Ovshinsky et al. | 429/59 |
| 5,556,719 | 9/1996 | Hong et al. | 429/218 |
| 5,578,266 | 11/1996 | Takai et al. | 420/900 |

FOREIGN PATENT DOCUMENTS

| | | |
|---|---|---|
| 6-215762 | 8/1994 | Japan . |
| 6-215767 | 8/1994 | Japan . |
| 6-306515 | 8/1994 | Japan . |
| 6-310136 | 11/1994 | Japan . |

OTHER PUBLICATIONS

Chen et al., "Effect of Pr content in MI on the electrochemical properties of ML(Ni–Co–Mn–AL)$_5$ alloys", *J. of Alloys and Compounds*, 231:550–552, (1995).

*Primary Examiner*—George Wyszomierski
*Assistant Examiner*—Robert Thompson
*Attorney, Agent, or Firm*—Fish & Richardson P.C.

[57] ABSTRACT

The surface of material containing a hydrogen storage alloy are treated with an organometallic compound to provide the alloy with corrosion resistance.

19 Claims, 4 Drawing Sheets

FIG. 2a
FIG. 2b
FIG. 2c
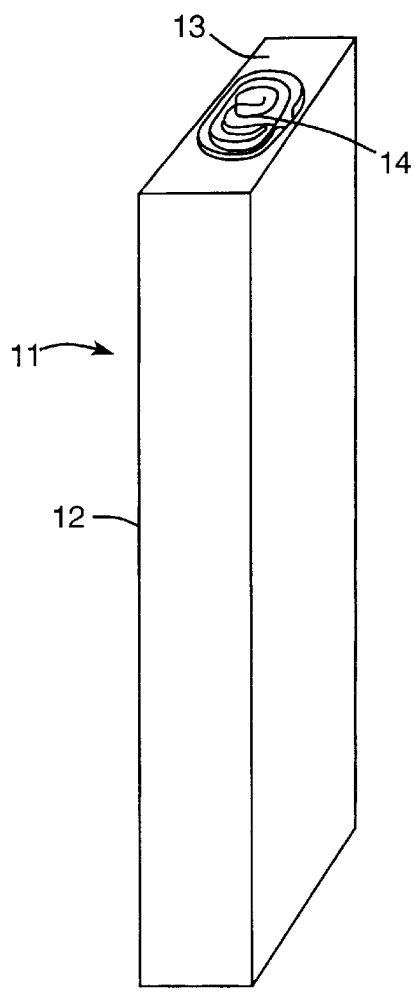
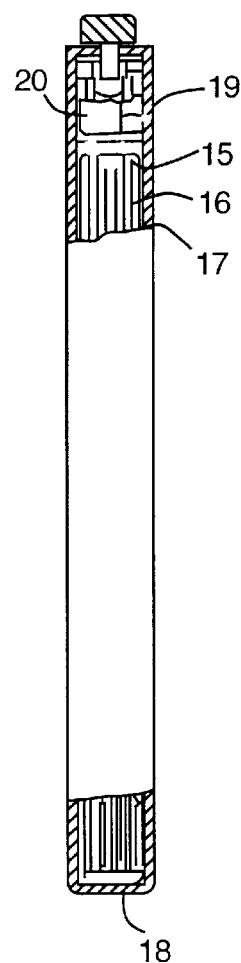
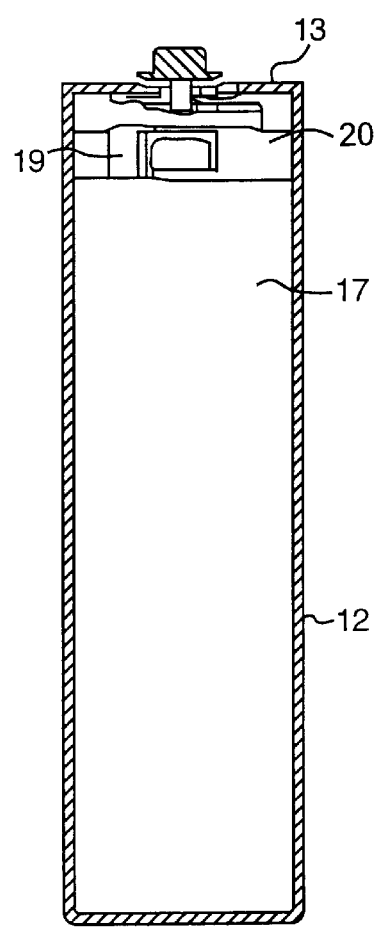

HYDROGEN STORAGE ALLOY

BACKGROUND OF THE INVENTION

The invention relates to hydrogen storage alloys for use in rechargeable batteries.

A battery typically includes one or more galvanic cells (i.e., cells that produce a direct current of electricity) in a finished package. In each cell, two electrodes are separated by an electron insulator, but are joined by an ion-carrying path. The electron-carrying path of the battery is external; the path proceeds via a conductor, through a device where work is done. The ion-carrying path of the battery is internal and proceeds via an electrolyte.

The electrodes are usually composed of dissimilar metals. The electrode where the electrolyte is broken down upon the receipt of electrons is the positive electrode, also referred to as the cathode. The electrode where the metal goes into solution, releasing electrons, is called the negative electrode, or anode. The electrolyte generally is composed mainly of an ionizable salt dissolved in a solvent.

Batteries may be rechargeable; such batteries are called "storage" or "secondary" batteries. Storage batteries can be recharged by passing current through the cells in the opposite direction of current flow discharge. The chemical conditions of the battery are restored, and the cells are ready to be discharged again. Primary batteries, on the other hand, are meant to be discharged to exhaustion once, and then discarded.

An example of a rechargeable battery is a metallic oxide-hydrogen storage battery. The positive electrode this battery includes a metal oxide, such as nickel oxide; the negative electrode includes a hydrogen storage alloy; and the electrolyte includes an alkaline solution.

An example of an electrode reaction in a nickel oxide-hydrogen storage battery is as follows.

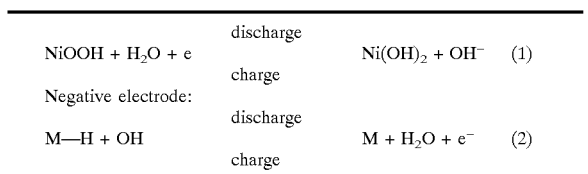

In the reaction equation (2), M represents a hydrogen storage alloy.

Hydrogen storage alloys are capable of electrochemically absorbing and discharging large quantities of hydrogen. Two common types of hydrogen storage alloys are $AB_2$ and $AB_5$. $AB_2$ hydrogen storage alloys are described, for example, in U.S. Pat. No. 5,277,999. $AB_2$ hydrogen storage alloys may be based, for example, on $TiNi_2$, and may have the general atomic structure Ni—Ti—V—Cr—Zr—x—y, where x and y are other elements.

In $AB_5$ hydrogen storage alloys, the A and B components are present in a mole ratio of about 1:5. The A component is generally composed of a mischmetal (a mixture of rare earth elements, generally cerium (Ce), lanthanum (La), neodymium (Nd), and praseodymium (Pr)), and the B component is generally composed of nickel (Ni), along with two or more elements selected from cobalt (Co), manganese (Mn), aluminum (Al), copper (Cu), iron (Fe), zirconium (Zr), or germanium (Ge).

The subscripts of the elements forming the A component generally have a sum of 1, while the subscripts of the elements forming the B component generally have a sum of 4.75 to 5.50.

It is desirable for rechargeable batteries to have a long cycle life. Cycle life is the number of times a battery can be recharged without the discharge capacity of the battery falling below a targeted level. In metallic oxide-hydrogen storage batteries, the cycle life often is limited by the corrosion-of the hydrogen storage alloy in the negative electrode. The corrosion may result, for example, from the formation of an oxide film on the surface of the hydrogen storage alloy.

SUMMARY OF THE INVENTION

Generally, the invention relates to limiting the corrosion of the hydrogen storage alloy used in metallic oxide-hydrogen storage batteries by treating a material including the hydrogen storage alloy with a metal such as titanium or zirconium. By limiting the corrosion of the hydrogen storage alloy used in the battery, the cycle life of the battery is increased.

One aspect of the invention features precipitating a organometallic compound onto the surface of the material and then heating the material to cause the organometallic compound to decompose.

Another aspect of the invention features contacting the surface of the material with an organometallic compound and then heating the material at a temperature above 800° C., preferably above 1000° C., to cause the organometallic compound to decompose.

Another aspect of the invention features a material including the hydrogen storage alloy and a metal deposit that is annealed into its surface. The deposit has an average depth of at least 0.2 microns, preferably at least 0.25 micron, as measured by Auger Electron Spectroscopy.

Preferably, the material is in the form of particles including the hydrogen storage alloy. The particles preferably have an average size of less than 75 microns, more preferably less than 40 microns, and include between 0.05% and 0.15% of the metal by weight (more preferably less than 0.1% by weight).

Another aspect of the invention features an electrode containing one of the materials described above.

Another aspect of the invention features a battery that includes an electrode containing one of the materials described above.

The metal deposit, by providing the hydrogen storage alloy with corrosion resistance, can lessen or eliminate the need for further treatment of the material prior to incorporation of the hydrogen storage alloy into the electrode. In addition, batteries including an electrode containing the material generally have good energy density, charge retention, and discharge capacity.

The invention also may be used to treat the surface of other materials with a metal. For example, the method can be used to provide a metal deposit on electrode materials (e.g., particles) other than hydrogen storage alloy-containing materials.

Other features and advantages of the invention will be apparent from the description of the preferred embodiment thereof, and from the claims.

BRIEF DESCRIPTION OF THE DRAWING

FIG. 2a is a perspective view of a rectangular storage cell;

FIGS. 2b and 2c are sectional views of a rectangular storage cell;

DESCRIPTION OF THE PREFERRED EMBODIMENTS

Figure 1:
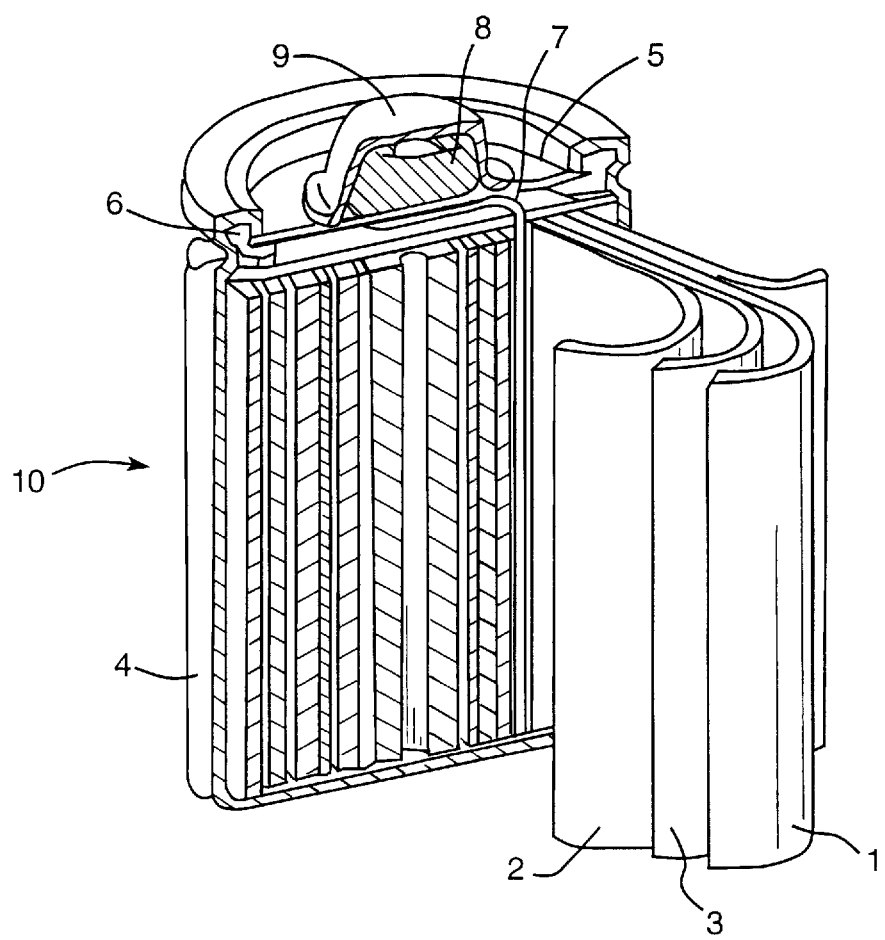
FIG. 1 is a sectional view of a cylindrical storage cell.

Referring to FIG. 1, a cylindrical battery 10 includes a negative electrode 1, a positive electrode 2, and a separator 3. The electrodes and the separator are contained within a case 4. The top end of the case 4 is closed with a sealing plate 5 and an annular insulating gasket 6 that provide a gas-tight and fluid-tight seal. A positive lead 7 connects the positive electrode 2 to the sealing plate 5. The sealing plate 5 is provided with a safety valve 8 disposed in the inner side of a positive terminal 9. The valve 8 is configured to actuate when the pressure inside the battery exceeds a predetermined value.

The main component of negative electrode 1 is an $AB_5$-type hydrogen absorbing alloy, which may be formed by fusing the appropriate elements. The mixture of elements is melted in an induction furnace under an argon atmosphere, then allowed to cool. The resulting alloy is pulverized by hydrogen absorption and desorption, mechanical pulverization, jet-milling, or other methods known in the art to form a powder, which is sieved to remove particles larger than 75 microns.

Alternatively, the alloy can be heat treated, and then pulverized. The heat treatment includes heating the alloy at 900° C. to 1100° C. for 1 to 12 hours, either under vacuum or under an argon atmosphere. The heat treatment helps to homogenize the elements.

The hydrogen storage alloy particles are subsequently treated with a metal. The metal may be, for example, Ti or Zr. The hydrogen storage alloy particles generally are treated with the metal by (1) providing a solution of an organometallic compound including the metal in an appropriate solvent; (2) combining the solution and the hydrogen storage alloy particles, with mixing; (3) precipitating the organometallic compound onto the particles; (4) removing the solvent; (5) heating the treated particles in an inert atmosphere to a temperature of at least 800° C. for at least eight hours to cause the compound to decompose and anneal into the particle surface; and (6) after cooling, grinding and sieving to provide hydrogen storage alloy particles, with a metal deposit, having the desired particle size (e.g., less than 75 microns).

Many examples of organometallic compounds are known. They include titanium diisopropoxide bis(2,4-pentanedionate) and zirconium acetylacetonate.

Negative electrode 1 may contain other ingredients as well. For example, the electrode may include a high surface area carbon. The carbon catalyzes the conversion of $O_2$, formed at the positive electrode, into $H_2O$, thus promoting pressure reduction in the battery. The electrode may also include a binder such as polytetrafluoroethylene (PTFE), and thickeners, such as a polyvinyl alcohol/sodium polyacrylate copolymer, and carboxymethyl cellulose (CMC).

Negative electrode 1 may be prepared as follows. The alloy is combined with the carbon, the binder, the thickeners, and water to form a paste. The paste is applied to a conductive core substrate, such as perforated nickel-plated cold rolled steel foil, or expanded metal. The material then is dried, rolled, and die cut into pieces of the appropriate size.

Positive electrode 2 may include any of a number of materials known in the electrochemical arts. For example, the positive electrode may include spherical nickel hydroxide, which may contain zinc and cobalt; cobalt monoxide; a binder, such as PTFE; thickeners such as CMC and sodium polyacrylate (SPA); and a paste stabilizer such as sodium borate.

Positive electrode 2 may be prepared as follows. The ingredients are combined with water to produce a paste, which is then applied to a highly porous sintered, felt, or foam substrate. The filled substrate is compacted, then pieces of the appropriate size are cut from the substrate. A nickel tab, which serves as a current collector, is then applied by ultrasonic welding.

Separator 3 is a porous insulator film or thin sheet; the film or sheet can be composed of a polyamide (such as nylon), polypropylene, polyethylene, polysulfone, or polyvinyl chloride (PVC). A preferred material is polypropylene. The separator is cut into pieces of a similar size as the electrodes, and is placed between the negative and positive electrodes to separate them electrically.

Negative electrode 1, positive electrode 2, and separator 3 are wound into a Swiss roll and placed in a case 4 made of a metal such as nickel or nickel plated steel, or a plastic material such as PVC, polypropylene, polysulfone, ABS, or polyamide.

The case 4 is then filled with an electrolyte. The electrolyte may be any electrolyte known in the art. An example of an electrolyte is potassium hydroxide (KOH) with a concentration of 20 to 40 weight %, plus lithium hydroxide (LiOH) with a concentration of 0 to 10 weight %.

The case 4 is then sealed with the sealing plate 5 and the annular insulating gasket 6.

Examples of cylindrical batteries that may be prepared according to the present invention include A, AA, AAA, 4/5A, 4/3A, sub-C, and half-C batteries.

Alternatively, the battery may be rectangular in form; an example of a rectangular battery is the prismatic cell described in U.S. Pat. No. 4,977,043, which is incorporated by reference in its entirety herein.

Referring to FIGS. 2a–2c, a rectangular battery 11 includes a case 12, a lid body 13, a positive electrode terminal 14, a positive electrode 15, a separator 16 which surrounds the positive electrode 15, a U-shaped negative electrode 17, a negative electrode lead 18, a positive electrode lead 19, and a frame body 20.

Figure 3:
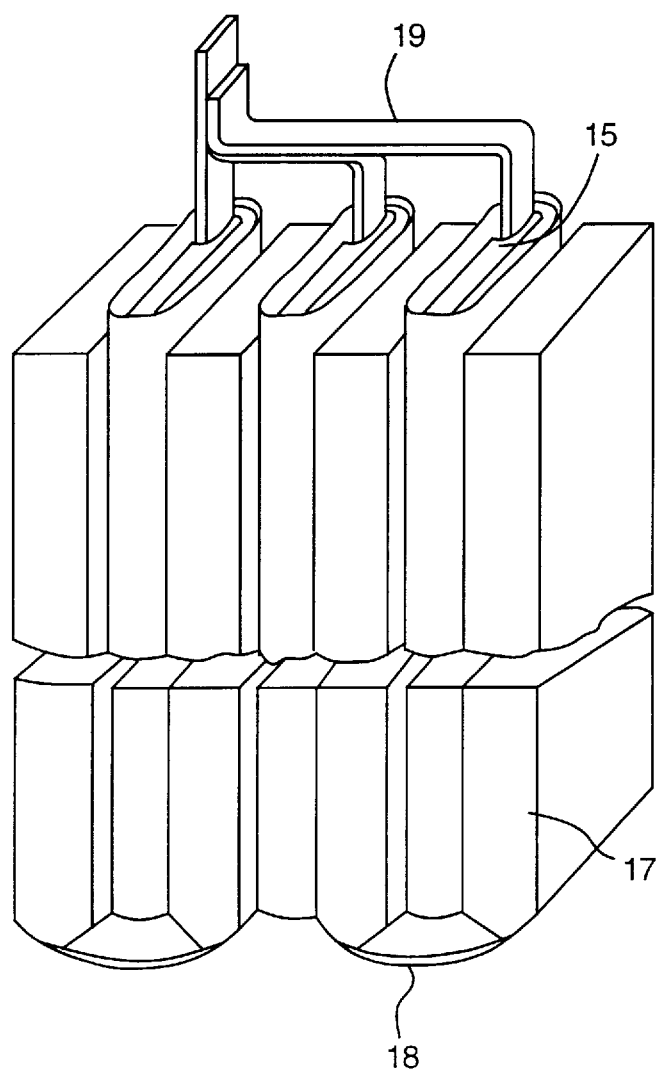
FIG. 3 is a perspective view of the electrode assembly of a rectangular storage cell.

FIG. 3 shows an expanded view of the electrode assembly. As shown there, the positive electrodes 15 are sandwiched between the U-shaped negative electrodes 17. The bottom part of the U includes a negative electrode lead 18.

The negative and positive electrodes may be prepared as described above, or as described in U.S. Pat. No. 4,977,043.

An example of a rectangular battery that may be prepared according to the present invention is a battery used to power electric vehicles.

Alternatively, a bobbin-type battery can be formed. To form this type of battery, the material forming the positive electrode is pressed into pellets. One or more of these pellets, surrounded by a separator, are placed into a case. The negative electrode material, in the form of a powder, and an electrolyte are added to the case. The case is then sealed.

Other types of batteries known in the art can be prepared as well.

EXAMPLE

Hydrogen storage alloy particles ($La_{0.63}$ $Ce_{0.26}$ $Pr_{0.03}$ $Nd_{0.08}$ $Ni_{3.68}$ $Co_{0.78}$ $Mn_{0.36}$ $Al_{0.28}$, available from Japan Metal Corp.) were treated with Ti according to the following procedure.

A solution of titanium diisopropoxide bis(2,4-pentanedionate) (Aldrich, col. 32, 525-2) (10 ml) was dissolved in 930 ml of acetone with stirring at room temperature. Water (750 ml) was added to the stirred solution, followed by 1500 g of the hydrogen storage alloy particles. The stirred mixture was heated to 45° to cause precipitation, and 850 ml of water was added to the stirred solution. The additional water is added to assure complete precipitation of the compound; stirring continued for 15 minutes at 45°. The mixture was filtered, and the solids heated in an oven at 75° for 45 minutes, and then at 110° for 45 minutes. The solid was broken up and sieved through a 75 micron sieve.

The solids then were placed in the ceramic tray in a furnace, and the furnace purged for 1.5 hours with argon. The furnace was programmed as follows: 2° C./min to 400° C. hold 0.5 hours, 2° C./min to 1050, hold 8 hours, cool to room temperature. The resultant Ti-treated hydrogen storage alloy particles were sieved to remove particles greater than 75 microns.

A 4/3A battery of the type shown in FIG. 1 was prepared using the general procedure described above.

The main component of the negative electrode 1 was the titanium-treated hydrogen storage alloy particles prepared above. The electrode also included (relative to the amount of hydrogen storage alloy, by weight): 0.7% high surface area carbon; 2.0% PTFE; 0.29% polyvinyl alcohol/sodium polyacrylate copolymer; and 0.12% CMC. The substrate used was perforated nickel plated cold rolled steel foil.

The main component of positive electrode 2 was nickel hydroxide, which included 5.0% zinc and 0.75% cobalt. The electrode also included (relative to the amount of nickel hydroxide, by weight): 0.5% EPDM rubber; 0.13% CMC; 0.18% SPA; 5.0% cobalt oxide; and 0.1% sodium borate. The substrate used was a porous nickel material.

The electrolyte included 5.5N KOH+2.0N NaOH+0.5N LiOH, and the separator 3 was polypropylene.

Figure 4:
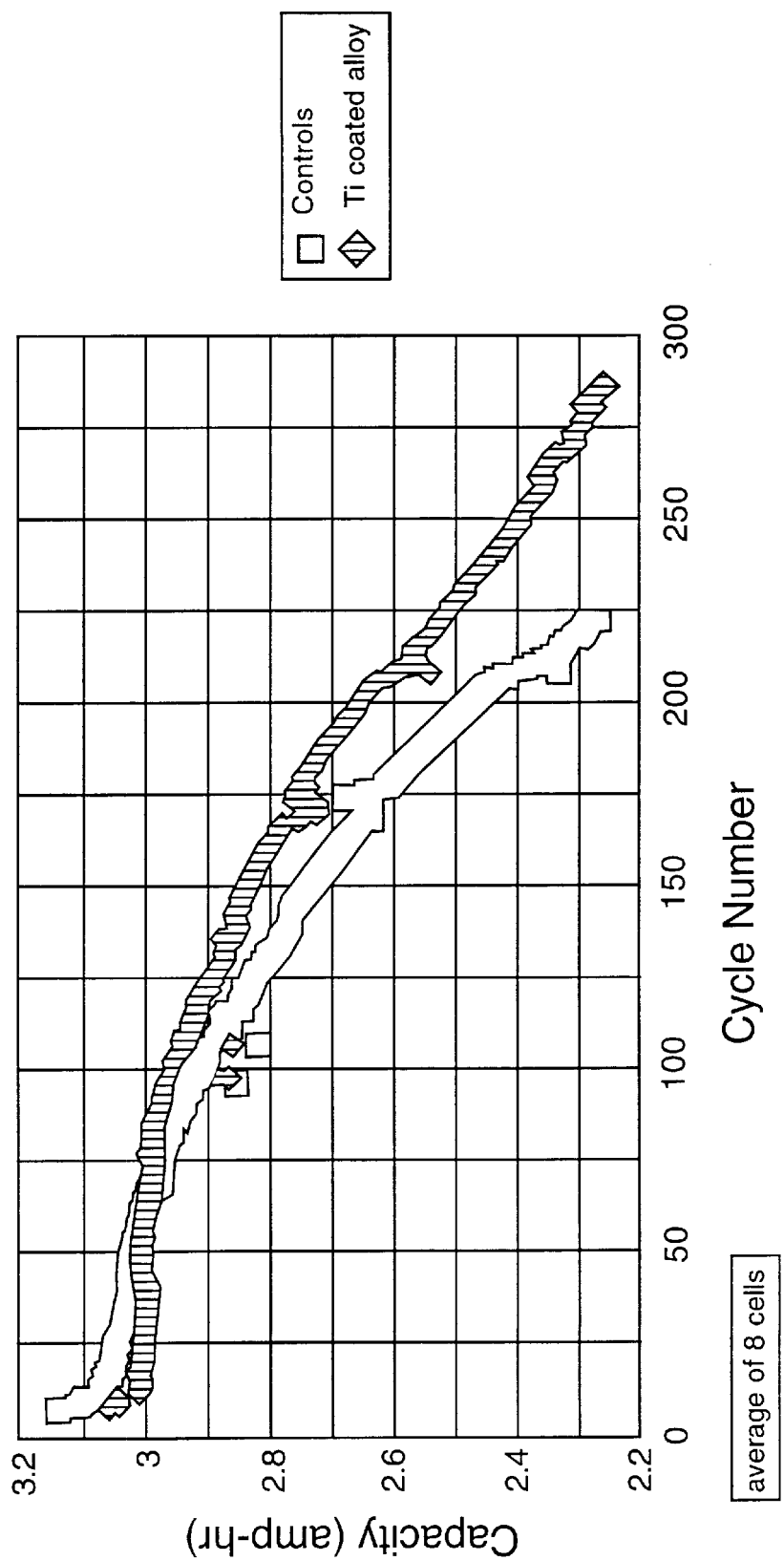
FIG. 4 is a chart displaying the increased cycle life of electrode including titanium-treated hydrogen storage alloy particles.

The same battery also was constructed, but with untreated hydrogen storage alloy particles. The end of cycle life was defined as 80% of rated capacity, or 2.48 Ahr. Referring to FIG. 4, the Ti-treated alloy cells provided an increase of 19% in cycle life (average of 8 cells per group), with standard deviation=18.31 for controls and 15.79 for Ti-treated alloy cells. The difference is significant within the 95% confidence interval.

The improved cycle life is the result of decreased pulverization of the alloy with cycling. This is depicted in Scanning Electron micrographs showing the titanium-treated alloy particles have much less pulverization. The SEM's that were taken from cells used to generate the results in FIG. 4 after they had completed more than 300 cycles. The decreased pulverization results in less corrosion because less surface area is exposed.

Other embodiments are within the claims.
What is claimed is:

1. A method of treating a surface of a material including a hydrogen storage alloy, comprising precipitating an organometallic compound onto a surface of the material, and heating the material sufficiently to decompose the organometallic compound on the surface.

2. The method of claim 1, wherein the organometallic compound comprises titanium.

3. The method of claim 1, wherein the organometallic compound comprises zirconium.

4. The method of claim 1, wherein the material is heated to a temperature of at least 800° C. on the surface.

5. The method of claim 1, wherein the material is heated to a temperature of at least 1000° C.

6. The method of claim 1, wherein the hydrogen storage alloy includes a hydrogen storage alloy having an $AB_5$ structure.

7. The method of claim 1, wherein the material comprises a particle including the hydrogen storage alloy.

8. The method of claim 7, wherein the particle has a diameter of less than 75 microns.

9. The method of claim 7, wherein the organometallic compound includes titanium.

10. The method of claim 7, wherein the organometallic compound includes zirconium.

11. A method of making an electrode for a metallic oxide-hydrogen storage alloy battery, comprising incorporating a material made according to claim 1 or 8 into an electrode.

12. A method of treating a surface of a material including a hydrogen storage alloy, comprising contacting a surface of the material with an organometallic compound, and heating the material to a temperature of at least 800° C. for a sufficient period of time for said organometallic compound to decompose and anneal into the surface.

13. The method of claim 12, wherein the organometallic compound includes titanium.

14. The method of claim 12, wherein the organometallic compound includes zirconium.

15. The method of claim 12, wherein the material is heated to a temperature of at least 1000° C.

16. The method of claim 12, wherein the hydrogen storage alloy has an $AB_5$ structure.

17. The method of claim 12, wherein the material comprises a particle including the hydrogen storage alloy.

18. The method of claim 12, wherein the particle has a diameter of less than 75 microns.

19. A method of making an electrode for a metallic oxide-hydrogen storage alloy battery, comprising incorporating a material made in accordance with claim 13 or claim 18 into an electrode.

* * * * *